(12) United States Patent
Singhal et al.

(10) Patent No.: US 8,046,350 B1
(45) Date of Patent: Oct. 25, 2011

(54) SYSTEMS AND METHODS FOR DETECTING COMMERCIAL QUERIES

(75) Inventors: Amit Singhal, Palo Alto, CA (US); Matt Cutts, Mountain View, CA (US); Jun Wu, Los Altos, CA (US)

(73) Assignee: Google Inc., Mountain View, CA (US)

( * ) Notice: Subject to any disclaimer, the term of this patent is extended or adjusted under 35 U.S.C. 154(b) by 672 days.

(21) Appl. No.: 10/668,142

(22) Filed: Sep. 24, 2003

(51) Int. Cl.
*G06F 17/30* (2006.01)
(52) U.S. Cl. .................. 707/710; 707/771; 707/999.002
(58) Field of Classification Search .................. 707/3, 2, 707/5, 6, 7, 999.002–999.005, 736, 748, 707/710, 771; 705/1
See application file for complete search history.

(56) References Cited

U.S. PATENT DOCUMENTS

| 6,321,224 | B1* | 11/2001 | Beall et al. ........................ 707/5 |
| 6,401,118 | B1* | 6/2002 | Thomas ........................ 709/224 |
| 6,826,559 | B1* | 11/2004 | Ponte ................................ 707/3 |
| 2003/0220912 | A1* | 11/2003 | Fain et al. ........................ 707/3 |
| 2005/0027670 | A1* | 2/2005 | Petropoulos ..................... 707/1 |
| 2005/0050045 | A1* | 3/2005 | Taira et al. ....................... 707/9 |

OTHER PUBLICATIONS

Wanda Pratt et al., "QueryCat: Automatic Categorization of MEDLINE Queries", year 2000, AMIA, Inc., pp. 655-659.*

* cited by examiner

*Primary Examiner* — Apu Mofiz
*Assistant Examiner* — Monica Pyo
(74) *Attorney, Agent, or Firm* — Harrity & Harrity, LLP (57) ABSTRACT

A system processes user queries. The system may generate a list of query patterns of a first type. The system may also receive a user query and determine whether the received query is a query of the first type based at least in part on the list of query patterns.

18 Claims, 6 Drawing Sheets

SYSTEMS AND METHODS FOR DETECTING COMMERCIAL QUERIES

FIELD OF THE INVENTION

The present invention relates generally to communication systems and, more particularly, to systems and methods for detecting types of queries, such as commercial queries.

BACKGROUND OF THE INVENTION

Networks, such as the Internet, have become an increasingly important part of our everyday lives. Millions of people now access the Internet on a daily basis to shop for goods and services, obtain information of interest (e.g., movie listings, news, etc.), and communicate with friends, family, and co-workers (e.g., via e-mail or instant messaging).

Currently, when a person wishes to purchase a product or simply find information on the Internet, the person enters into his/her web browser a Uniform Resource Locator (URL) pertaining to a web site of interest in order to access that particular web site. The person then determines whether the product or information of interest is available at that particular web site.

When the person does not know where to go to find, for example, a desired product, the person may "search" for web sites that sell the product using a search engine. For example, suppose a person wishes to purchase a laser printer via the Internet. The person may access a web site that includes a conventional search engine. The person may enter one or more terms relating to the product, such as "laser printer," into the search engine to attempt to locate web sites that sell that product. Searching for products or information of interest in this manner has become very popular. As such, companies often desire to have their web site(s) listed very highly in search results, thinking that a highly visible listing will result in increased sales.

Many techniques exist that allow companies to obtain a highly ranked listing. For example, some search engines allow companies to buy certain search terms. If a search query is received with those search terms, then the company that has purchased those search terms may be ranked more highly than other companies offering the same product. In other situations, a company may attempt to "trick" the search engine into listing the company's web site more highly. For example, if the search engine gives greater weight in ranking results to words used in the domain name associated with web sites, a company may attempt to trick the search engine into ranking the company's listing more highly by including desirable search terms in the domain name associated with the company's listing. As an example, assume that company A sells laser printers. Company A may attempt to use a domain name that includes the words "laser printers" so that a search engine may rank the company's listing more highly. As a result, a person searching for laser printers may not be presented with an unbiased set of results.

Therefore, there exists a need for systems and methods for improving the ranking of search results.

SUMMARY OF THE INVENTION

Implementations consistent with the principles of the invention detect whether search queries are commercial search queries. When a commercial search query is detected, measures may be taken to ensure that a person is provided with an unbiased set of results.

In accordance with one implementation consistent with the principles of the invention, a method for processing a query is provided. The method may include receiving a query, determining whether the query is a commercial query or a non-commercial query, and processing the query in a first manner when the query is determined to be a non-commercial query. The method may further include processing the query in a second, different manner when the query is determined to be a commercial query.

In another implementation consistent with the principles of the invention, a method for creating a list of commercial query patterns is provided. The method may include obtaining a group of commercial data, where the group of commercial data includes at least one of a list of user queries, words or phrases targeted by advertisers or webmasters, domain names, and host names. The method may further include creating the list of commercial query patterns based at least in part on the group of commercial data.

In a further implementation consistent with the principles of the invention, a server includes a processor and a memory. The processor may obtain a list of user queries, obtain search-related information, and generate a list of commercial query patterns based at least in part on the list of user queries and the search-related information. The memory may store the generated list of commercial query patterns.

In yet another implementation consistent with the principles of the invention, a method for processing user queries is provided. The method may include generating a list of commercial query patterns, receiving a user query, and determining whether the received query is a commercial query based at least in part on the list of commercial query patterns.

In still another implementation consistent with the principles of the invention, a method for processing a user query is provided. The method may include generating a list of query patterns of a predetermined type. The method may further include receiving a user query and determining whether the received user query is of the predetermined type based at least in part on the list of query patterns of the predetermined type.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of implementations consistent with the principles of the invention refers to the accompanying drawings. The same reference numbers in different drawings may identify the same or similar elements. Also, the following detailed description does not limit the invention.

Implementations consistent with the principles of the invention score queries to rate how commercial the queries may be. The information that may be used to score a query may include, for example, attributes of documents that match or do not match the query; user-provided data concerning the query or documents that match or do not match the query, such as bid prices; additional databases of information; stored information about the historical attributes of a query or related query, or of matching documents, or the like.

Exemplary System

Figure 1:
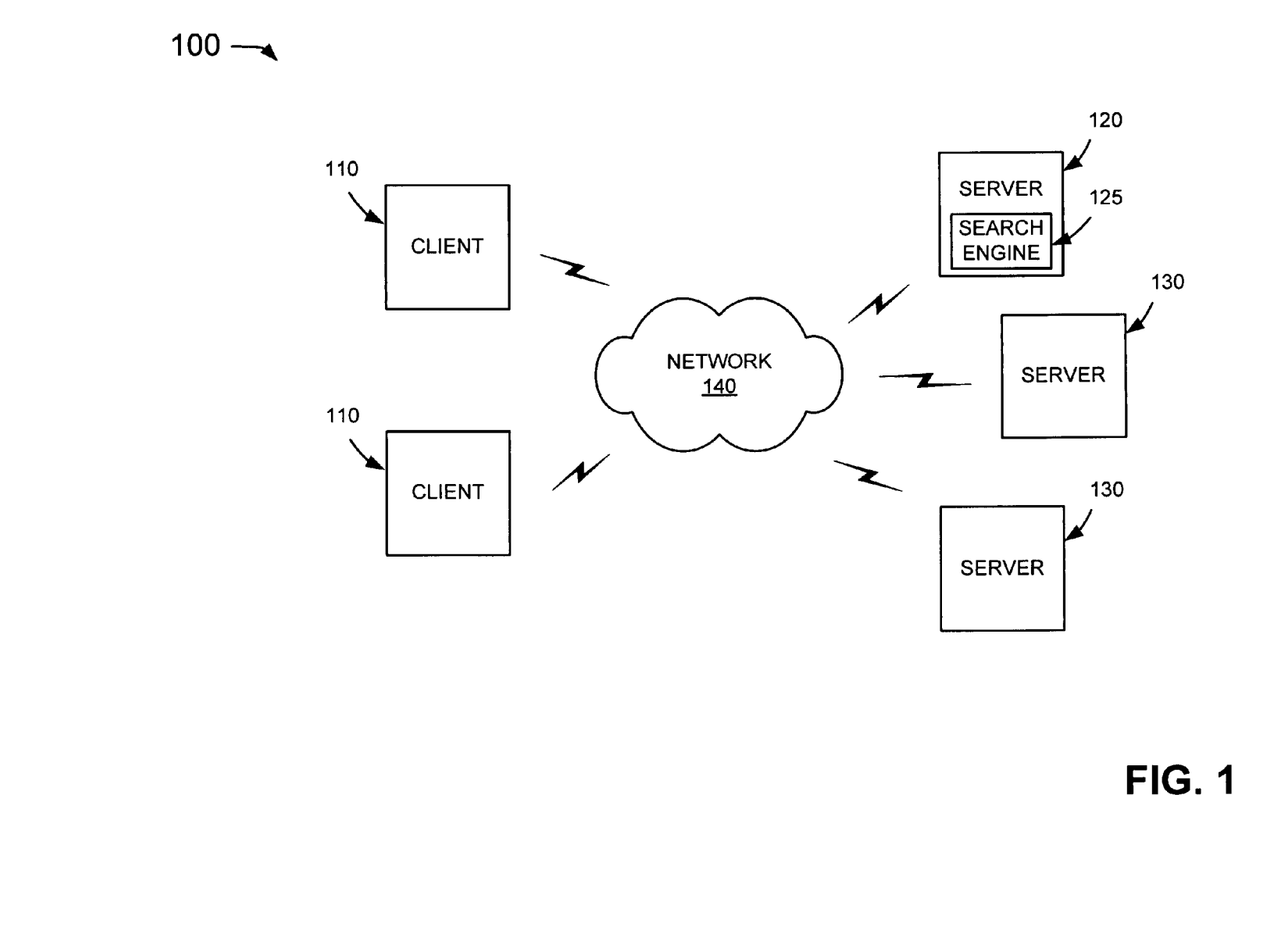
FIG. 1 is an exemplary diagram of a system in which systems and methods consistent with the principles of the invention may be implemented.

FIG. 1 is an exemplary diagram of a system 100 in which systems and methods consistent with the principles of the invention may be implemented. System 100 may include multiple clients 110 connected to servers 120 and 130 via a network 140. Network 140 may include a local area network (LAN), a wide area network (WAN), a telephone network, such as the Public Switched Telephone Network (PSTN), an intranet, the Internet, a similar or dissimilar network, or a combination of networks. Two clients 110 and three servers 120/130 have been illustrated as connected to network 140 in FIG. 1 for simplicity. In practice, there may be more or fewer clients 110 and/or servers 120/130. Also, in some instances, a client 110 may perform the functions of a server 120/130 and a server 120/130 may perform the functions of a client 110.

Clients 110 may include devices, such as wireless telephones, personal computers, personal digital assistants (PDAs), lap tops, etc., threads or processes running on these devices, and/or objects executable by these devices. Servers 120/130 may include server devices, threads, and/or objects that operate upon, search, or maintain documents in a manner consistent with the principles of the invention. Clients 110 and servers 120/130 may connect to network 140 via wired, wireless, or optical connections.

In an implementation consistent with the principles of the invention, server 120 may include a search engine 125 usable by clients 110. Servers 130 may store objects (or web documents) accessible by clients 110.

Exemplary Server Configuration

Figure 2:
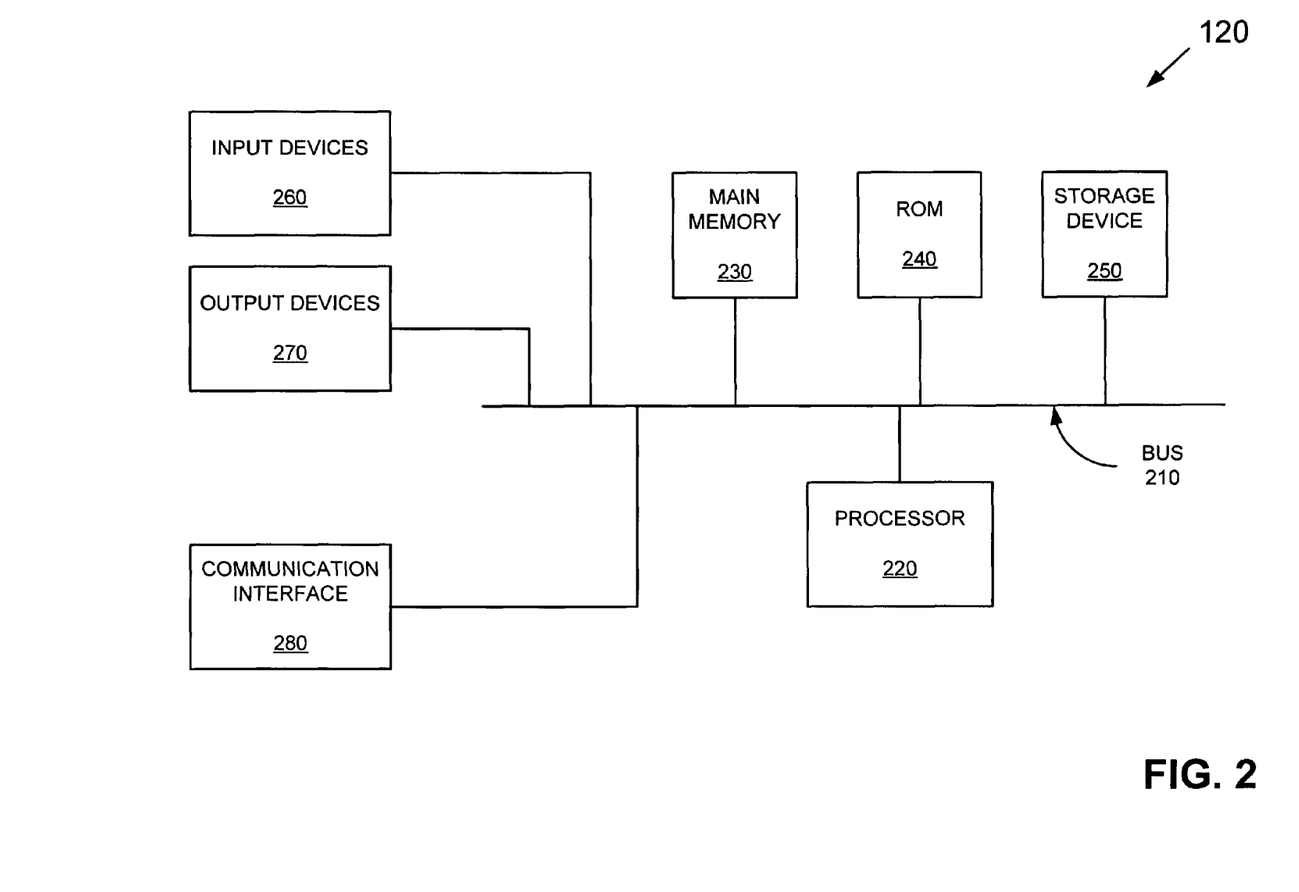
FIG. 2 is an exemplary diagram of the server of FIG. 1 in an implementation consistent with the principles of the invention.

FIG. 2 is an exemplary diagram of server 120 in an implementation consistent with the principles of the invention. Clients 110 and servers 130 may be similarly configured. Server 120 may include a bus 210, a processor 220, a main memory 230, a read only memory (ROM) 240, a storage device 250, one or more input devices 260, one or more output devices 270, and a communication interface 280. Bus 210 may include one or more conductors that permit communication among the components of server 120.

Processor 220 may include any type of conventional processor or microprocessor that interprets and executes instructions. Main memory 230 may include a random access memory (RAM) or another type of dynamic storage device that stores information and instructions for execution by processor 220. ROM 240 may include a conventional ROM device or another type of static storage device that stores static information and instructions for use by processor 220. Storage device 250 may include a magnetic and/or optical recording medium and its corresponding drive.

Input devices 260 may include one or more conventional mechanisms that permit a user to input information to server 120, such as a keyboard, a mouse, a pen, one or more biometric mechanisms, such as a voice recognition device, etc. Output devices 270 may include one or more conventional mechanisms that output information to the user, including a display, a printer, a speaker, etc. Communication interface 280 may include any transceiver-like mechanism that enables server 120 to communicate with other devices and/or systems. For example, communication interface 280 may include mechanisms for communicating with another device or system via a network, such as network 140.

As will be described in detail below, server 120, consistent with the principles of the invention, may generate a list of commercial queries and detect, using the list of commercial queries, whether a received query is a commercial query. Server 120 may perform these operations in response to processor 220 executing software instructions contained in a computer-readable medium, such as memory 230. A computer-readable medium may be defined as one or more memory devices and/or carrier waves. The software instructions may be read into memory 230 from another computer-readable medium, such as data storage device 250, or from another device via communication interface 280. The software instructions contained in memory 230 may cause processor 220 to perform processes that will be described later. Alternatively, hardwired circuitry may be used in place of or in combination with software instructions to implement processes consistent with the principles of the invention. Thus, the invention is not limited to any specific combination of hardware circuitry and software.

Server 120, consistent with the principles of the invention, may be associated with one or more databases. The databases may be stored at server 120 (e.g., in memory 230) or externally from server 120.

Figure 3:
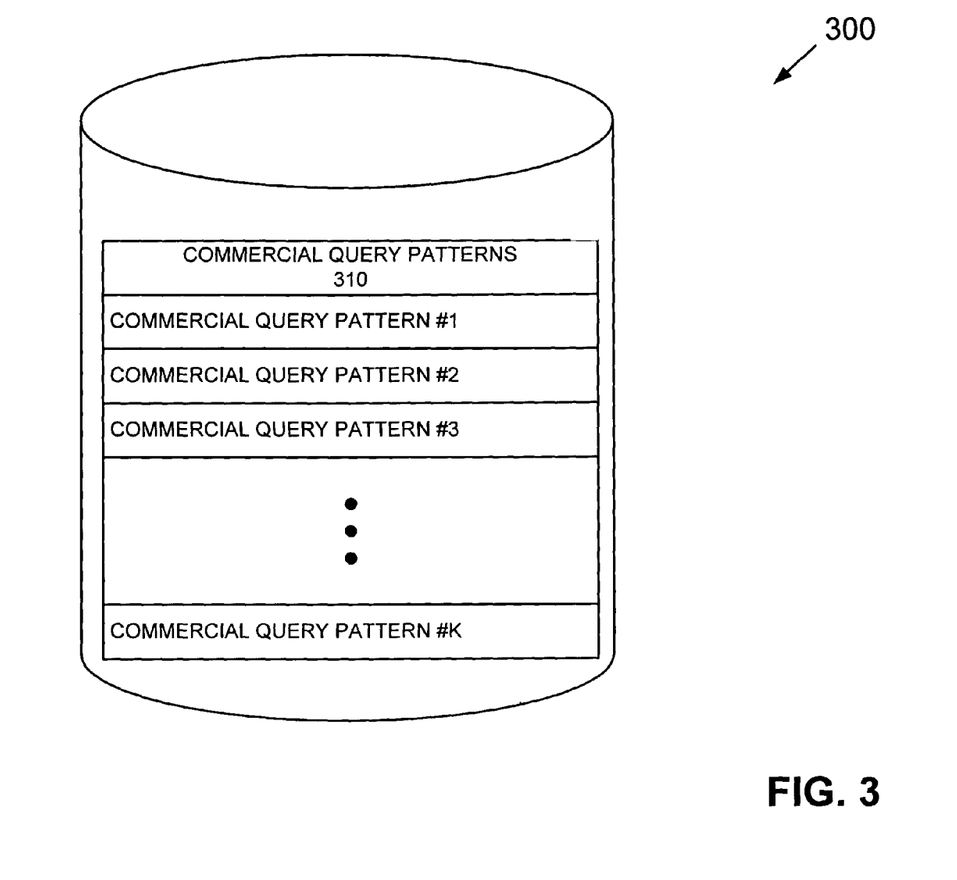
FIG. 3 is an exemplary diagram of a database that may be associated with the server of FIG. 2 in an implementation consistent with the principles of the invention.

FIG. 3 is an exemplary diagram of a database 300 that may be associated with server 120 in an implementation consistent with the principles of the invention. While only one database is described below, it will be appreciated that server 120 may be associated with one or more additional databases (not shown) stored locally at server 120 or distributed throughout network 140.

As illustrated, database 300 may include a commercial queries field 310 that stores a list of commercial queries 1–K, where K is an integer greater than or equal to 1. As will be described in greater detail below, the list of commercial queries 310 may be used in determining whether a query received, for example, from client 110 is a commercial query. Each commercial query in commercial queries field 310 may include a group of one or more words.

Exemplary Processing

Figure 4A:
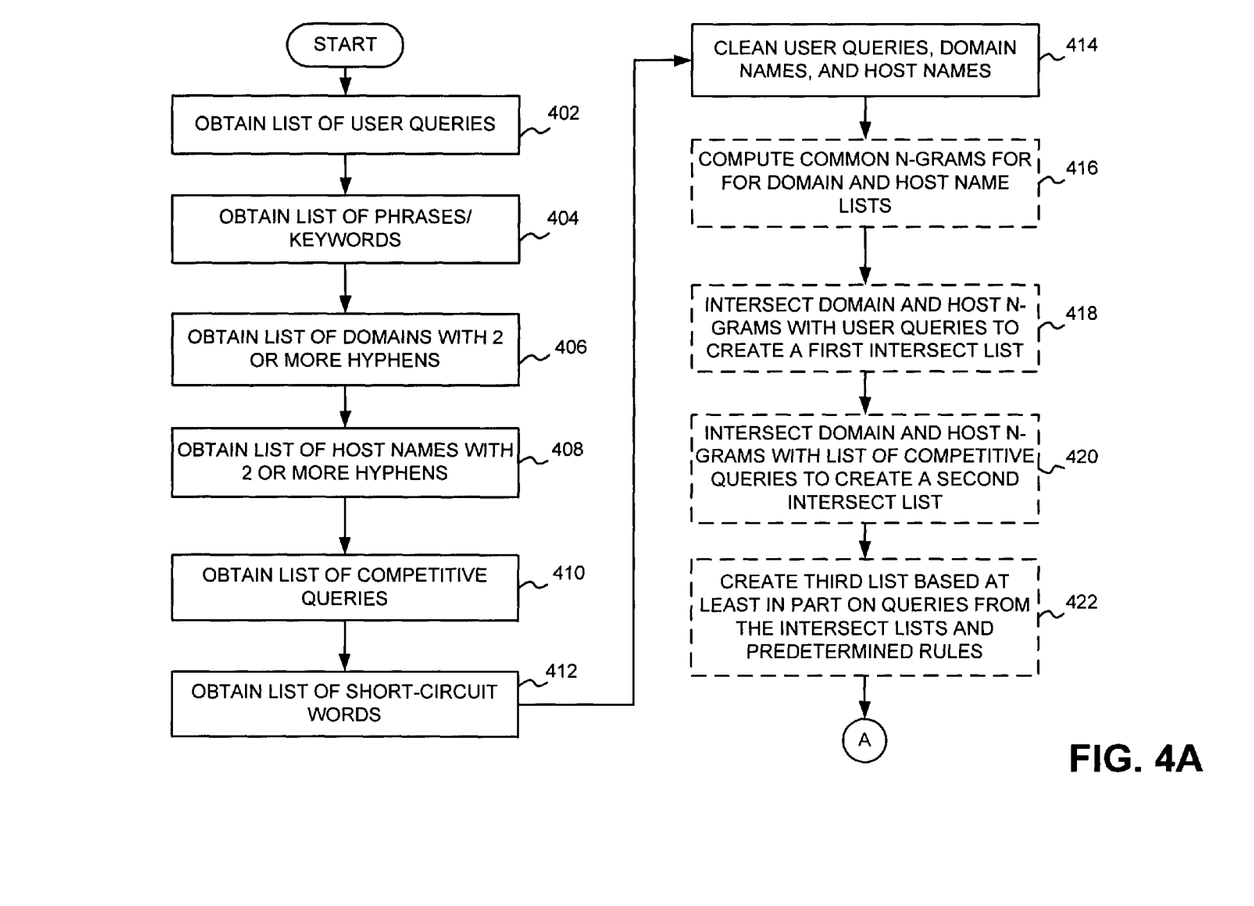
FIGS. 4A and 4B are a flow chart of an exemplary process for generating a list of commercial query patterns in an implementation consistent with the principles of the invention.
Figure 4B:
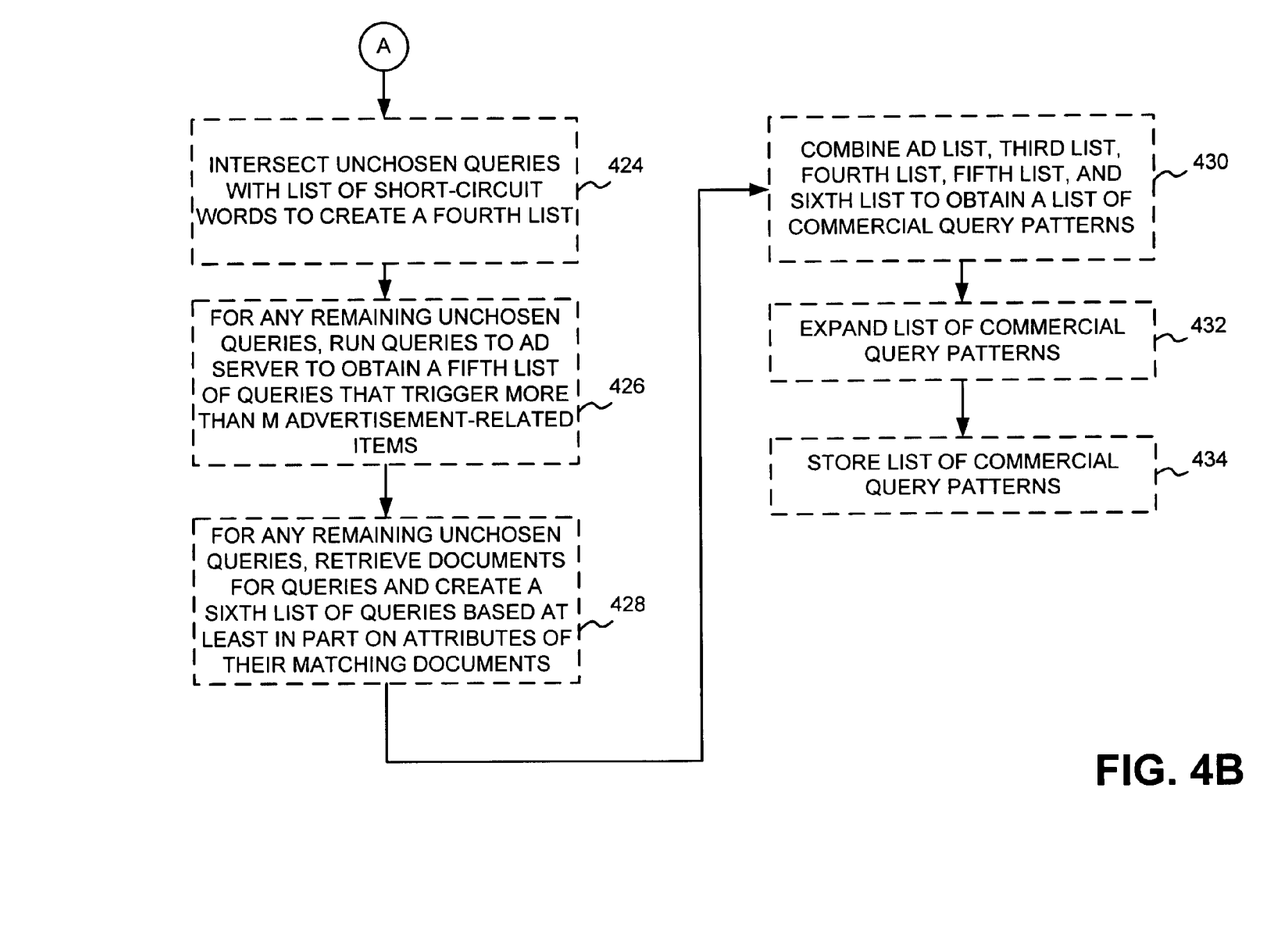

FIGS. 4A and 4B are a flow chart of an exemplary process for generating a list of commercial query patterns in an implementation consistent with the principles of the invention. The process described below may be performed automatically by, for example, server 120 or manually by a human operator. In alternative implementations, parts of the process described below may be performed automatically while other parts may be performed manually. Moreover, the process may be performed once or at predetermined intervals (e.g., biannually, annually, etc.).

Processing may begin by obtaining a list of user queries (act 402, FIG. 4A). In one implementation consistent with the principles of the invention, server 120 may store, for example, in memory 230, search queries received by search engine 125. To obtain the list of user queries, server 120 may retrieve those stored search queries that occur at least once in a predetermined number of search queries. For example, server 120 may retrieve those stored search queries that occur at least once per 100 million queries. The user query list may include millions or even billions of user queries.

Server 120 may obtain a list of phrases and/or keywords that are of interest to advertisers and/or webmasters (act 404). The list of phrases and/or keywords (referred to hereinafter as the "ad list") may include those phrases/keywords that are used in advertising, as well as those phrases/keywords that are provided via any implicit or explicit feedback, such as phrases/keywords used in meta tags. To obtain advertising phrases/keywords, a search engine may allow companies to choose the phrases and/or keywords with which the companies want their advertisements (or web sites) to be associated. For example, a shoe company may desire to have their advertisement(s) (or web site) associated with the following phrase and keyword: "running shoes" and "sneakers." In some instances, an owner of the search engine may allow companies to buy the phrases and/or keywords to guarantee that their advertisement(s) show up highly (e.g., via a banner advertisement) when a search query is received by the search engine containing those phrases or keywords. These phrases and keywords may be stored in a database that is associated with server 120. In one implementation consistent with the principles of the invention, the list of phrases and/or keywords obtained by server 120 in act 404 may be retrieved from this database of advertiser phrases and keywords. In another implementation consistent with the principles of the invention, server 120 may retrieve those phrases and keywords that have been bought by companies when obtaining the ad list.

Server 120 may obtain a list of domain names that contain greater than a predetermined number of hyphens (act 406). In one implementation consistent with the principles of the invention, server 120 may obtain a list of those domain names that contain 2 or more hyphens. A number of different factors may be considered when a search engine scores a document, such as a web page, for relevance. For example, the content of the document, the heading of the document (e.g., the title of a document may be given more weight when scoring the document), and other documents that link to the document and the text that is used by the other documents to link to the document may be considered when scoring a document. In some search engines, one or more phrases and/or keywords in the domain name of the document (e.g., "buy-credit-cards-online.com") may cause the document to be scored more highly when that phrase is present in a user query. If phrases and/or keywords show up several times in hyphenated domain names, it may be an indication that the phrases and/or keywords are likely part of a commercial query. As indicated above, some companies try to trick search engines into ranking their documents (e.g., web pages) more highly by including one or more phrases and/or keywords in their domain name. For example, assume two companies A and B provide credit cards. Assume further that company A uses its company name as its domain name (e.g., "your-bank.com") and company B uses a domain name, such as "low-apr-credit-cards.com." If a person is searching for credit cards online, some search engines may rank company B's web page more highly than company A's web page, because of the phrase contained in company B's domain name. It is very common to see domain names that include a single hyphen, but when two, three, or more hyphens are present, this is often an indication that these domain names are associated with companies that are attempting to trick search engines into ranking their web pages more highly.

Server 120 may obtain, in any conventional manner, the list of domain names that contain greater than a predetermined number of hyphens. For example, it is possible to obtain a list of all .com domain names, .net domain names, .edu domain names, and .org domain names that exist on a given day from such companies as Network Solutions, Verisign, and the like. From this list, server 120 may obtain the list of domain names that contain greater than a predetermined number of hyphens.

Server 120 may obtain a list of host names that contain greater than a predetermined number of hyphens (act 408). A host name, as one skilled in the art will appreciate, is a sub-domain. It is possible for a server (or other network device) to be associated with multiple host names for a single domain. For example, a company that offers credit cards may be associated with the domain name "bank.com" and a group of host names (e.g., "buy-credit-cards.bank.com," "low-apr-credit-cards.bank.com," "online-credit-cards.bank.com"). In one implementation consistent with the principles of the invention, server 120 may obtain a list of those host names that contain 2 or more hyphens. For similar reasoning to that described above with respect to domain names, some companies may attempt to cause search engines to rank documents associated with the companies more highly due to the presence of one or more phases and/or keywords in the host name associated with the documents.

Server 120 may obtain the list of host names that contain greater than a predetermined number of hyphens in any conventional manner. For example, in one implementation consistent with the principles of the invention, a program (e.g., a web spider or robot program that discovers host names as it crawls the web) may be used to identify host names that contain greater than a predetermined number of hyphens. A list may then be formed to include these identified host names.

Server 120 may obtain a list of competitive queries (act 410). In some instances, it may be very profitable for a company to show up at the top (or near the top) of a list of search results. As such, it is common for companies to continually transmit search queries to a search engine, such as search engine 125, using those phrases and/or keywords for which they desire their advertisement or web site to appear. In this manner, the companies can check to see where their advertisement or web site appears in relation to their competitors. Server 120 may form the list of competitive queries by identifying those company queries (e.g., queries used to check search engine rankings) since those queries contain phrases and/or keywords that are important to those companies. The list of competitive queries may also include user queries that are used for shopping for products (e.g., those queries directed to Froogle (i.e., froogle.google.com)).

Server 120 may obtain a list of short-circuit words (i.e., those words that are very likely to be targeted by advertisers) (act 412). For example, words like hotels, reservations, pharmacy terms (e.g., Viagra, Celebrex, etc.), mortgages, etc. are keywords that are likely to be targeted by advertisers. Using these short-circuit words, server 120 can very quickly assume for a particular query that the query is very likely to be commercial. Server 120 may obtain the list of short-circuit words, for example, by monitoring the types of queries received at search engine 125, through experience with commercial queries, through manual evaluation, or via user reports.

Server 120 may clean the list of user queries, domain names, and host names by, for example, removing stop words (i.e., those commonly used words, such as "the," that search engines are typically programmed to ignore), digits, punctuation, etc. (act 414). For example, for the domain name "buy-credit-cards-online.com," server 120 may remove the hyphens and ".com" portion to leave the following phrase "buy credit cards online." As another example, suppose a user query in the user query list includes the following phrase "where can I find low apr credit cards." Server 120 may clean the user query by eliminating "where can I find," to leave the phrase "low apr credit cards." In one implementation, server 120 may compare, in a manner similar to that described below with respect to FIG. 5, a received query to the phrases and/or keywords in the lists obtained in acts 402-412 to determine whether the query is commercial.

Alternatively, server 120 may optionally determine common n-grams from the domain name list and the host name list (act 416), where an n-gram is a list of n order-independent words and where n is a positive integer greater than or equal to one. In one implementation, server 120 may determine common 2-grams, 3-grams, 4-grams, and 5-grams from the domain name and host name lists. For example, assume that the domain name list includes the domain name "buy-cheap-credit-cards-online.com." Server 120 may form the following exemplary n-grams for this domain name: "credit cards," "buy cards," "cheap cards," "buy credit cards," "cheap credit cards," "buy cheap cards," "buy card online," "cheap cards online," "credit cards online," "buy credit cards online," "buy cheap credit cards," "buy cheap credit cards online." Other n-grams may also be formed.

Server 120 may optionally intersect the domain name n-grams and host name n-grams with the list of user queries to form a first intersect list of queries (act 418). Here, server 120 may identify those n-grams from the domain name n-gram list that occur in the user query list and those n-grams from the host name n-gram list that occur in the user query list. The server 120 may output a list of each identified n-gram, along with the number of occurrences in the user query list and the number of occurrences in the domain name or host name n-gram list.

Server 120 may optionally intersect the domain name n-grams and host name n-grams with the list of competitive queries to form a second intersect list of queries (act 420). Here, server 120 may identify those n-grams from the domain name n-gram list that occur in the list of competitive queries and those n-grams from the host name n-gram list that occur in the list of competitive queries. The server 120 may output a list of each identified n-gram, along with the number of occurrences in the competitive query list and the number of occurrences in the domain name or host name n-gram list.

Server 120 may optionally create a third list based at least in part on the queries in the first and second intersect lists and a group of predetermined rules (act 422). For example, server 120 may form the third list by including any query from the first and second intersect lists that includes two or more words and for which one of a group of predetermined rules is satisfied. In one implementation, the predetermined rules may dictate that if a query includes 2 words and the query occurs 5 or more times in the intersect lists, then the query may be included in the third list. Moreover, if the query includes 3 words and the query occurs 4 or more times, then the query may be included in the third list. If the query includes 4 words and the query occurs 3 or more times, then the query may be included in the third list. If the query includes 5 words and the query occurs 2 or more times, then the query may be included in the third list. With these exemplary rules, short queries are included in the third list if they occur several times. Longer queries can occur fewer times before including the queries in the third list.

For any query not included in the ad list or third list, server 120 may optionally intersect these queries with the short-circuit word list to create a fourth list (act 424, FIG. 4B). For example, if a query that was not included in the ad list or third list includes a word from the list of short-circuit words, then server 120 may include that query in the fourth list. Assume that the query "buy Viagra" was not included in the ad list or third list and that "Viagra" is in the list of short-circuit words. Since "Viagra" is included in the short-circuit word list, server 120 may include the query "buy Viagra" in the fourth list.

Server 120 may optionally take any query that has not been included in the ad list, the third list, or the fourth list, and send each query to an ad server to determine whether the query triggers M or more advertisement-related items (e.g., ads, sponsor links, sponsor results, feature links, etc.) (act 426), where M is a positive integer greater than or equal to one. In one implementation, the value of M may be set to 3. In this situation, server 120 may include each query that triggers 3 or more advertisement-related items into a fifth list. Other techniques for scoring the value of a query based at least in part on advertisement-related items may alternatively be used. For example, ads may be valued by click price (e.g., cost per click (CPC)) or by the price of one impression (e.g., priced in units of cost-per-thousand impressions (CPM)). A query may be scored based at least in part on the aggregate CPC or CPM prices for the query (i.e., the sum of the value of the ads triggered by this query). Scoring may also be based at least in part on the highest priced ad, the median price, or any mathematical combination of prices.

Server 120 may optionally take any query that has not been included in the ad list, the third list, the fourth list, or the fifth list and retrieve a set of documents for each query (act 428). For each set of documents, server 120 may examine attributes of those documents to determine whether the query corresponding to the set of documents is commercial. For example, documents that target commercial terms may be more likely to include many keywords in their meta tags. Therefore, if a query is associated with a set of documents that includes many keywords in their meta tags, then server 120 may include the query in the sixth list.

Server 120 may optionally combine the ad list with the third list, the fourth list, the fifth list, and the sixth list to obtain a list of commercial query patterns 310 (act 430). Server 120 may optionally expand the list of commercial query patterns (act 432). For example, server 120 may expand the list of commercial query patterns through the use stemming (e.g., "walk" is a stem of "walking") or to include synonyms (e.g., "automobile" is a synonym for "car") and/or related words (e.g., the term "tivo" may be related to "pvr" (personal video recorder) or "replaytv"). As will be described below, a received user query may be considered a commercial query if it matches a pattern in this list of commercial query patterns (or equivalence classes). Server 120 may then store the list of commercial query patterns in, for example, database 300 or another location (act 434).

The following example illustrates the above processing. Assume that server 120 obtains the user query list, ad list, domain name list, host name list, competitive queries list, and short-circuit words list illustrated in Tables 1-6, respectively, in the manner described above with respect to acts 402-412. It will be appreciated that these lists are provided for explanatory purposes only and are in no way intended to be exhaustive.

TABLE 1

User query list.

tell me about credit cards
student credit cards
Free credit cards
discover credit cards
capital one credit cards
online credit cards
Visa credit cards
credit cards low interest
interest credit cards
Best credit cards
Visa credit cards online
0.0 apr credit cards
accepting credit card payment online
cheap online credit cards

TABLE 2

Ad list.

visa credit cards
low interest credit cards
credit cards online
alliance & leister credit cards

TABLE 3

Domain name list online-credit-cards.com
interest-credit-cards.com
rate-credit-cards.com
ns--credit-cards.com
visa-credit-cards.com
best-credit-cards.com
student-credit-cards.com
top-student-credit-cards.com
dns-quick-credit-cards.com
visa-credit--cards-online.com

TABLE 4

Host name list.

discount-online.credit-cards.com
student.online-credit-cards.com
wholesale-online.credit-cards.com
cheap-online.credit--cards.com
mastercard.credit--cards.com

TABLE 5

Competitive queries list credit cards uk
discount credit cards
low apr credit cards
free credit cards
discount online credit cards
best credit cards

TABLE 6

Short-circuit word list

Mortgage
Sex

TABLE 6-continued

Short-circuit word list cheap
Free

Server 120 may then take the user queries (e.g., tell me about credit cards), the domain names (e.g. online-credit-cards.com), and host names (e.g., mastercard.credit—cards.com) and clean them up (act 414) to form, for example, "credit cards," "online credit cards," and "mastercard credit cards," respectively. Server 120 may use the above lists in any combination to determine whether a received query is a commercial query.

Alternatively, server 120 may optionally create common n-grams for the domain name and host name lists (act 416). For example, server 120 may create the following 3-grams from the list of domain names illustrated in Table 3 above: online credit cards, interest credit cards, rate credit cards, student credit cards, etc. Server may also create the following 3-grams from the list of host names illustrated in Table 4 above: discount credit cards, online credit cards, student credit cards, etc.

Server 120 may optionally create a first intersect list (act 418). To do so, server 120 may put a query in this list if the query is in the user query list (Table 1) and in either the domain name list (Table 3) or the host name list (Table 4). For example, "visa credit cards" occurs in both the user query list (Table 1) and the domain name list (Table 3). Therefore, server 120 would include "visa credit cards" in the first intersect list. Similarly, "cheap online credit cards" occurs in both the user query list (Table 1) and the host name list (Table 4). Therefore, server 120 would include "cheap online credit cards" in the first intersect list.

Server 120 may optionally create a second intersect list (act 420). To do so, server 120 may put a query in this list if the query is in the competitive queries list (Table 5) and in either the domain name list (Table 3) or the host name list (Table 4). For example, "best credit cards" occurs in both the competitive queries list (Table 5) and the domain name list (Table 3). Therefore, server 120 would include "best credit cards" in the second intersect list. Similarly, "discount online credit cards" occurs in both the competitive queries list (Table 5) and the host name list (Table 4). Therefore, server 120 would include "discount online credit cards" in the second intersect list.

Server 120 may optionally create a third list (act 422). To do so, server 120 may determine, for each query in the first and second intersect lists, whether the query occurs a certain number of times in the lists. For example, if a query is very short (e.g., "credit cards" is two words), then server 120 may include the query in the third list if it occurs several times. If a query is longer (e.g., "discount online credit cards"), then fewer occurrences are needed for server 120 to include it in the third list. Therefore, if a query is in one of the intersect lists and is common enough, then server 120 may mark that query as commercial by including it in the third list.

Server 120 may optionally create a fourth list (act 424). To do so, server 120 may determine, for all of the queries not included in either the ad list or the third list, if the queries contain a word/phrase from the short-circuit word list (Table 6). For example, the user query "free credit cards" was not included in the ad list or third list. Since, however, the user query contains the word "free" from the short-circuit word list (Table 6), server 120 may include "free credit cards" in the fourth list.

Server 120 may optionally create a fifth list (act 426). To do so, server 120 may send any queries that are not included in the ad list, third list, or fourth list (e.g., the user query "credit cards low interest") to an ad server to identify the number of advertisement-related items triggered by the queries. If a query triggers more than M ads, sponsor links, sponsor results, feature links, etc. (e.g., more than 3), then server 120 may include the query in the fifth list. For example, if "credit cards low interest" returns nine ads, then server 120 may include "credit cards low interest" into the fifth list. Conversely, if "accepting credit card payment online" returns only one ad, then server 120 may not include the query in the fifth list.

Server 120 may optionally create a sixth list to include those queries that are not included in the ad list, third list, fourth list, or fifth list whose matching documents have attributes that are "commercial" in nature (act 428). For example, if the user query "discover credit cards" was not included in the ad list, the third list, the fourth list, or the fifth list, server 120 may retrieve a set of matching documents for that query. If the attributes of the set of matching documents are commercial in nature, then server 120 may include "discover credit cards" in the sixth list.

Server 120 may then combine the ad list, third list, fourth list, fifth list, and sixth list to create a commercial query patterns list (act 430). Server 120 may optionally expand the list of commercial query patterns (act 432) to include, for example, synonyms and/or related words. Server 120 may also optionally use stemming to expand the list of commercial query patterns. For example, if the list of commercial query patterns includes the pattern "buy credit cards," server 120 may expand the list of commercial query patterns to include, for example, "purchase credit cards," "buying credit cards," "purchasing credit cards," "buy credit card," "buying credit card," "purchase credit card," and "purchasing credit cards." Server 120 may store the commercial query patterns list in, for example, database 300 (act 434). In one implementation consistent with the principles of the invention, the final commercial query patterns list may be encoded in an efficient, binary format. Thereafter, a Bloom filter (or other type of filter) may be used for determining whether a query is included in the final list of commercial query patterns.

Figure 5:
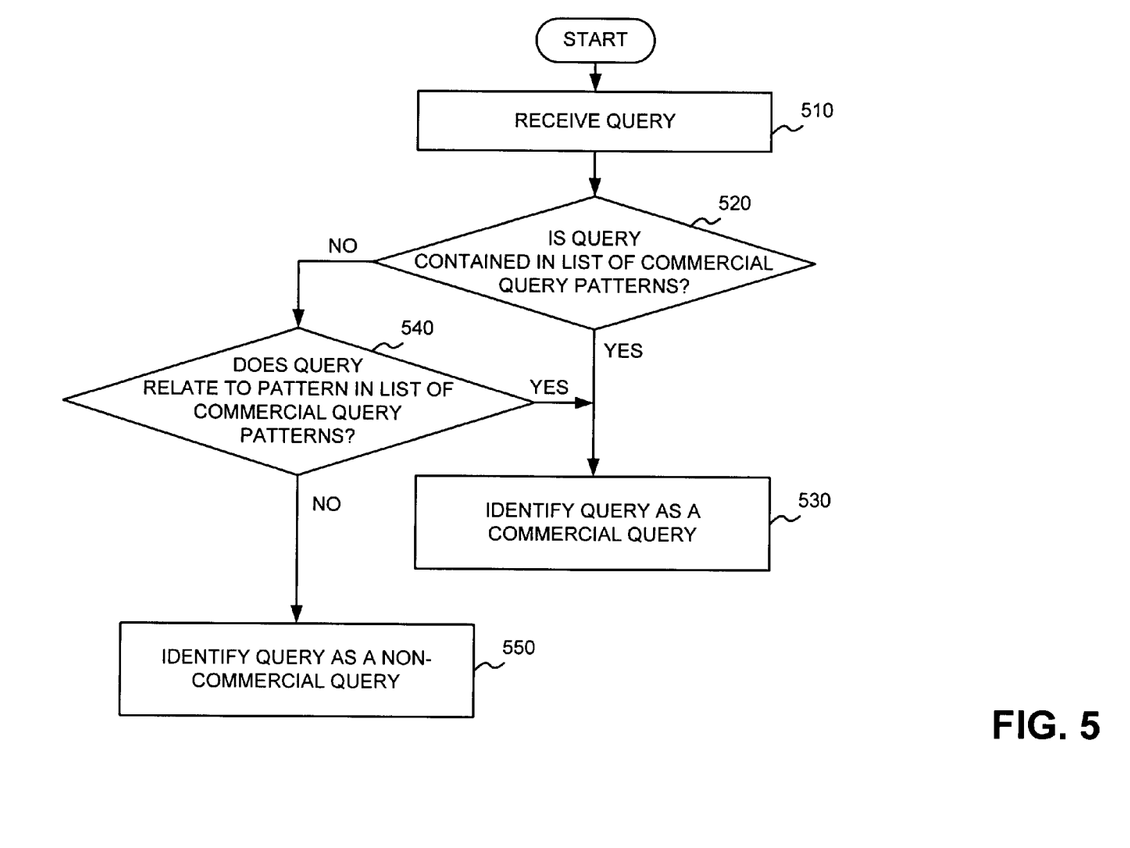
FIG. 5 is a flow chart of an exemplary process for quickly determining whether a received query is a commercial query in an implementation consistent with the principles of the invention.

FIG. 5 is a flow chart of an exemplary process for quickly determining whether a received query is a commercial query in an implementation consistent with the principles of the invention. Processing may begin with server 120 receiving a user query from, for example, client 110 (act 510). Server 120 may determine whether the received query is a commercial query. To do so, server 120 may determine whether the query is contained in the final list of commercial query patterns 310 stored, for example, in database 300 (act 520). As described above, this determination may be made using a Bloom filter (or other type of filter). If the received query is contained in the list of commercial query patterns 310, then server 120 may determine that the query is a commercial query (act 530). In the example above, if the received query is "free credit cards," then server 120 would determine that the query is a commercial query because "free credit cards" is contained in the list of commercial query patterns 310. Because list 310 includes commercial patterns, it will be appreciated that the order of the wording in a user query may not influence the decision as to whether the query is a commercial query. For example, if the received query contained "credit cards free," server 120 may still determine that the query is a commercial query.

If, on the other hand, the received query is not contained in the final list of commercial query patterns 310 (act 520), search engine 125 may determine whether the query relates to a commercial query pattern in the final list of commercial query patterns 310 (act 540). For example, server 120 may determine whether a subset of the words in the query is contained in the list of commercial query patterns 310. For a four word query (a b c d), for example, server 120 may determine whether any of subsets (a b c), (a b d), (a c d), etc. is contained in the list of commercial query patterns 310. As another example, assume that the query "credit cards low interest" is contained in the list of commercial query patterns 310, but that "low interest credit cards online" is not. If a query "low interest credit cards online" is received, server 120 may determine if the query is contained in the list of commercial query patterns 310. If it is not, then server 120 may determine if a portion of the query is contained in list 310. Server 120 may determine that "low interest credit cards" matches the commercial query pattern "credit cards low interest" stored in list 310. Since a 4 word query that was commercial was identified in the received 5 word query, server 120 may treat the 5 word query as commercial.

In other implementations, server 120 may use stemming, synonyms, related words, categories or taxonomies or ontology (e.g., the query maps to a commercial section of directory, such as Yahoo or the Open Directory Project), or any other semantic knowledge that relates queries to commercial queries to determine whether a query relates to one of the queries in the list of commercial query patterns 310. The stemming, synonym determination, etc. may be applied to the query, the patterns in the list of commercial query patterns 310, or to both the query and the patterns in the list of commercial query patterns 310. For example, if the query pattern "buy credit cards" is contained in the final list of commercial query patterns 310, server 120 may determine that the received query "buying credit cards" is a commercial query through the use of stemming. Similarly, server 120 may determine that the query "purchase credit cards" is a commercial query since "purchase" is a synonym for "buy."

Returning to act 540, if server 120 determines that the received query does not relate to the query patterns contained in the list of commercial query patterns 310, server 120 may determine that the query is a non-commercial query (act 550). Server 120 may process non-commercial queries in a conventional manner. For example, server 120 may retrieve a set of documents and rank the documents in a well-known manner (e.g., based at least in part on a predetermined set of criteria). If, on the other hand, server 120 determines that the received relates to a query pattern in the list of commercial query patterns 310, server 120 may identify the received query as a commercial query (act 530). Server 120 may, for example, rank the group of documents retrieved in response to the query differently when the query is determined to be a commercial query. For example, server 120 may weigh documents' domain names less heavily when scoring documents retrieved as a result of a query when the query is determined to be a commercial query. In this way, attempts to trick search engines into scoring a particular company's documents (e.g., web site) more highly can be diminished.

Other techniques may be used for detecting commercial queries. For example, in a system in which advertisers bid on terms, one can use the bid price as a proxy for determining how commercial a query is. For example, if a high bid price is associated with the term "Viagra," server 120 may determine that a query containing that term is commercial. In other implementations consistent with the principles of the invention, where, for example, the determination of whether a query is commercial need not be made as quickly as the technique described above would allow, information other than pre-computed lists may be used to determine whether a query is commercial. For example, in another implementation consistent with the principles of the invention, server 120 may send a received query to one or more backend servers and use the many types of information that are sent back from these backend servers to determine if a query is commercial. The backend servers may, for example, return information that indicates how many results had hyphenated domain names or host names. The backend servers may alternatively return the scores for documents. Server 120 may base the decision as to whether a query is commercial at least in part on the number of hyphenated domain names or host names, or the distribution of scores. Almost any document attribute could be stored with the backend servers and used to determine if a query is commercial. For example, the decision of whether a query is commercial may based at least in part on such information as the attributes of documents that match the query, or other explicit information (e.g., information regarding the willingness to pay a certain cost-per-click or cost-per-impression for a query) or implicit information (e.g., information as the length of time a user stays on a certain web page).

CONCLUSION

Implementations consistent with the principles of the invention can quickly determine whether a query is a commercial query. In this way, the ranking of search results may be adjusted to take into account attempts to trick the search engine into ranking results more highly.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. For example, the above-described functions need not be performed by server 120. In other implementations, one or more of the acts described in FIG. 5 may be performed by a client 110. For example, a browser assistant (i.e., software that operates in conjunction with a conventional web browser) may perform one or more of the acts described with respect to the process of FIG. 5.

Moreover, while the above-description focused on detecting commercial queries, implementations consistent with the principles of the invention are equally applicable to detecting other types of queries, such as queries for geographic information, navigational queries (e.g., a query of "ibm" is likely looking for IBM's home page), time-based queries, news-related queries, natural language queries, queries involving proper names, etc.

While series of acts have been described with regard to FIGS. 4 and 5, the order of the acts may be varied in other implementations consistent with the present invention. Moreover, non-dependent acts may be implemented in parallel.

No element, act, or instruction used in the description of the present application should be construed as critical or essential to the invention unless explicitly described as such. Also, as used herein, the article "a" is intended to include one or more items. Where only one item is intended, the term "one" or similar language is used.

What is claimed is:

1. A method performed by one or more server devices, the method comprising:

receiving, at one or more processors of the one or more server devices, a query, from a client device, that includes one or more terms;

determining, by one or more processors of the one or more server devices, whether the query is a commercial query by:

determining whether the one or more terms of the query, in any particular order, matches a commercial query pattern in a list of commercial query patterns, where the list of commercial query patterns includes patterns associated with one or more host names or domain names that include more than a particular number of hyphens, and identifying the query as a commercial query when the one or more terms of the query, in any particular order, matches the commercial query pattern in the list of commercial query patterns;

processing, by one or more processors of the one or more server devices, the query in a first processing manner when the query is not determined to be a commercial query, where processing the query in the first processing manner includes ranking documents in a first ranking manner; and processing, by one or more processors of the one or more server devices, the query in a second, different processing manner in response to determining that the query is a commercial query, where processing the query in the second processing manner includes ranking documents in a second, different ranking manner.

2. The method of claim 1 where the determining whether the query is a commercial query further includes:

determining, when the one or more terms of the query is not included in the list of commercial query patterns, whether the one or more terms of the query relates to at least one commercial query pattern in the list of commercial query patterns, identifying the query as a commercial query when the one or more terms of the query relates to at least one commercial query pattern in the list of commercial query patterns, and identifying the query as not being a commercial query when the one or more terms of the query is unrelated to the list of commercial query patterns.

3. The method of claim 2 where the determining whether the query relates to at least one commercial query pattern in the list of commercial query patterns includes:

determining whether the one or more terms of the query relates to at least one commercial query pattern based at least in part on at least one of whether a stem word of the one or more terms of the query matches a stem word of a commercial query pattern in the list, or whether a synonym of the one or more terms of the query matches a commercial query pattern in the list.

4. The method of claim 1 where the processing the query in the first processing manner includes:

retrieving one or more documents relating to the query, and scoring the one or more documents based at least in part on a first set of criteria.

5. The method of claim 4 where the processing the query in the second, different processing manner includes:

retrieving the one or more documents relating to the query, and scoring the one or more documents based at least in part on a second, different set of criteria.

6. The method of claim 1 where the determining whether the query is a commercial query includes:

determining whether the query is a commercial query based at least in part on one or more attributes of documents that match the query.

7. The method of claim 1 where the determining whether the query is a commercial query further includes:
determining whether the query is a commercial query based at least in part on user-supplied data regarding the query or documents that match the query.

8. The method of claim 1, where the patterns associated with the one or more host names or domain names that include more than a particular number of hyphens include patterns generated from the one or more host names or domain names that include more than a particular number of hyphens.

9. A computer-implemented system, comprising:
means for receiving one or more queries that each includes one or more terms;
means for identifying whether each query of the one or more queries is a commercial query, where the means for identifying includes:
means for determining whether a subset of the one or more terms of each query in the one or more queries is included in a list of commercial query patterns, where the list of commercial query patterns includes patterns generated from one or more host names or domain names that include more than a particular number of hyphens, and
means for identifying one of the queries in the one or more queries as a commercial query when a subset of the one or more terms of the one of the queries is included in the list of commercial query patterns; and
means for processing each query in the one or more queries based at least in part on the identifying, where the means for processing each query in the one or more queries based at least in part on the identifying includes:
means for ranking documents in a first manner when the query is not identified as commercial; and
means for ranking documents in a second, different manner when the query is identified as commercial.

10. The computer-implemented system of claim 9, further comprising:
means for determining, when the one of the queries in the one or more queries is not included in the list of commercial query patterns, whether the one of the queries in the one or more queries is similar to at least one commercial query pattern in the list of commercial query patterns,
means for identifying the one of the queries in the one or more queries as a commercial query when each query in the one or more queries query is similar to at least one commercial query pattern in the list of commercial query patterns, and
means for identifying the one of the queries in the one or more queries query as not being a commercial query when each query in the one or more queries is not similar to the list of commercial query patterns.

11. The computer-implemented system of claim 10, where the means for identifying the one of the queries in the one or more queries as a commercial query includes:
means for determining whether the one or more terms of the query is similar to at least one commercial query pattern based at least in part on at least one of whether a stem word of the one or more terms of each query matches a stem word of a commercial query pattern in the list, or whether a synonym of the one or more terms of each query matches a commercial query pattern in the list.

12. A server comprising:
a memory to store instructions; and
a processor to execute the instructions to:
receive a query that includes one or more terms,
identify whether the query is commercial by:
determining whether the one or more terms of the query, in any particular order, matches a commercial query pattern in a list of commercial query patterns, where the list of commercial query patterns includes patterns associated with one or more host names or domain names that include more than a particular number of hyphens, and
identifying the query as a commercial query when the one or more terms of the query, in any particular order, matches the commercial query pattern in the list of commercial query patterns, and
process the query based at least in part on whether the query is identified as commercial;
rank documents in a first manner when the query is not identified as commercial; and
rank documents in a second, different manner when the query is identified as commercial.

13. The server of claim 12, where the processor is further configured to execute the instructions to:
retrieve one or more documents relating to the query, and
score the one or more documents based at least in part on a first set of criteria when the query is not identified as commercial.

14. The server of claim 13, where the processor is further configured to execute the instructions to:
retrieve the one or more documents relating to the query, and
scoring the one or more documents based at least in part on a second, different set of criteria when the query is identified as commercial.

15. The server of claim 12, where the patterns associated with one or more host names or domain names that include more than a particular number of hyphens include patterns generated from the one or more host names or domain names that include more than a particular number of hyphens.

16. A computer-readable storage medium containing instructions for controlling at least one processor to perform a method for processing a search query that includes a plurality of terms, the method comprising:
identifying whether the search query is a commercial query by:
determining whether a subset of the plurality of terms of the search query is included in a list of commercial query patterns, where the list of commercial query patterns includes patterns generated from one or more host names or domain names that include more than a particular number of hyphens, and
identifying the search query as a commercial query when the subset of the plurality of terms of the search query is included in the list of commercial query patterns; and
processing the search query based at least in part on whether the search query is a commercial query, where processing the search query based at least in part on whether the search query is a commercial query or a non-commercial query includes:
ranking documents in a first manner when the search query is identified as commercial; and
ranking documents in a second, different manner when the search query is not identified as commercial.

17. The computer-readable storage medium of claim 16, where the identifying whether the search query is a commercial query includes:

identifying whether the search query is a commercial query based at least in part on one or more attributes of documents that match the search query.

18. The computer-readable storage medium of claim 16, where the identifying whether the search query is a commercial query includes:

identifying whether the search query is a commercial query based at least in part on user-supplied data regarding the search query or documents that match the search query.

* * * * *